(12) United States Patent
Van Horssen

(10) Patent No.: US 7,575,399 B2
(45) Date of Patent: Aug. 18, 2009

(54) QUICK CHANGE HOLDER FOR CUTTING TOOL

(76) Inventor: Charles A. Van Horssen, 21622 N. 14th Ave., Phoenix, AZ (US) 85027

( * ) Notice: Subject to any disclaimer, the term of this patent is extended or adjusted under 35 U.S.C. 154(b) by 0 days.

(21) Appl. No.: 11/998,058

(22) Filed: Nov. 28, 2007

(65) Prior Publication Data

US 2008/0075542 A1  Mar. 27, 2008

Related U.S. Application Data

(63) Continuation-in-part of application No. 11/366,139, filed on Mar. 2, 2006, now Pat. No. 7,322,775, which is a continuation-in-part of application No. 11/148,118, filed on Jun. 8, 2005, now Pat. No. 7,153,069.

(51) Int. Cl.
*B23P 15/28* (2006.01)
*B26D 1/00* (2006.01)
*B23B 27/16* (2006.01)

(52) U.S. Cl. .......................... 407/107; 407/112; 407/99; 407/98

(58) Field of Classification Search ................. 407/111, 407/107, 108, 109, 110, 91
See application file for complete search history.

(56) References Cited

U.S. PATENT DOCUMENTS

| | | | |
|---|---|---|---|
| 2,659,962 A * | 11/1953 | Doerseln ..................... 407/87 |
| 3,981,607 A * | 9/1976 | Jorgensen ................... 408/146 |
| 4,066,376 A * | 1/1978 | Eckle et al. ................. 407/101 |
| 4,533,283 A * | 8/1985 | Satran et al. ................ 407/111 |
| 4,552,046 A * | 11/1985 | Dombrowski et al. ......... 82/159 |
| 4,596,502 A * | 6/1986 | Cattani ....................... 409/231 |
| 5,846,032 A * | 12/1998 | Murakami ................... 407/102 |
| 5,975,811 A * | 11/1999 | Briese ......................... 407/40 |
| 6,969,218 B2 * | 11/2005 | Lach et al. ..................... 407/5 |
| 7,153,069 B1 * | 12/2006 | Van Horssen ............... 407/111 |
| 7,322,775 B2 * | 1/2008 | Van Horssen ............... 407/111 |
| 2002/0131829 A1 * | 9/2002 | Persson et al. ................ 407/77 |
| 2004/0247404 A1 * | 12/2004 | Oettle ......................... 407/117 |
| 2006/0280566 A1 * | 12/2006 | Van Horssen ............... 407/111 |
| 2007/0183857 A1 * | 8/2007 | Wihlborg ..................... 407/67 |

* cited by examiner

*Primary Examiner*—Boyer D Ashley
*Assistant Examiner*—Sara Addisu
(74) *Attorney, Agent, or Firm*—Frank J. McGue

(57) ABSTRACT

A self contained, toolless quick change tool holder for trigon cutter inserts on machine tools comprises a housing having at least one seat portion which is adapted to receive and conform to the shape of a variant shaped cutter insert. A fork is mounted in the insert housing and is movable within the insert housing. The fork engages a variant shaped cutter insert. A locking mechanism is contained within the housing and has a clamp position which forces the clamp portion to engage a variant shaped cutter insert and a release position which forces the clamp portion to disengage from a variant shaped cutter insert to allow removal and replacement of said variant shaped shaped cutter insert. The locking mechanism moves between the release position and the clamp position.

10 Claims, 4 Drawing Sheets

QUICK CHANGE HOLDER FOR CUTTING TOOL

RELATED APPLICATION

This is a continuation-in-part of patent application Ser. No. 11/366,139 filed Mar. 2, 2006, now U.S. Pat. No. 7,322,775, which is a continuation-in-part of patent application Ser. No. 11/148,118 filed Jun. 8, 2005, now U.S. Pat. No. 7,153,069.

TECHNICAL FIELD

This invention relates generally to the field of cutting tool holders, and, more particularly, to an improved cutting tool holder which avoids the need for tools to change cutting tools thereby providing the ability to quickly change cutting tools as needed in machine shops.

BACKGROUND OF THE INVENTION

In the metal cutting or machining industry, metals and other hard materials are made into a desired finished shape by various cutting operations. The cutting tools used in the industry have sharp edges and are manufactured from materials that are much harder than those being cut. However, the forces involved in cutting metals and other hard materials are substantial and thus the cutting tools and the materials being cut must be held extremely securely with a very high degree of rigidity. In addition, the geometry of the cutting edges of said tools is very broad and strong when compared, for example, to the edge of a knife blade. This very broad edge also further increases the cutting forces required.

There are two general modes of cutting that are performed in the industry. The first is external cutting where material is removed from the exterior surfaces of the raw material or part to be machined. An analogous cutting technique would be peeling an apple.

The second cutting mode in internal cutting where material is removed from surfaces which are surrounded by the material itself such as drilling a hole. Carrying the analogy further, an example of internal cutting is coring the apple.

There are also two general types of machining techniques employed in the industry which can be used for either cutting mode. In the first technique, the material to be machined (hereinafter the "workpiece"), is rotated rapidly and continuously in a lathe spindle. The cutting tool is brought into contact with the rotating workpiece causing removal of material. This technique is known in the industry as turning and the modern lathe is called a turning center.

In the second technique, the workpiece is rigidly held in a fixed position and rapidly rotating cutting tools are brought into contact therewith thereby causing material to be removed. This technique is known as milling and the machine is a milling machine. However, modern machine tools often have both milling and turning capabilities in the same machine. Such dual capable machines are called machining centers.

There are three general shapes of tools in use today. The first shape is the drill and related hole making tools such as reamers and boring bars. Some of the larger tools in this category use inserts described below, but much of the hole making tooling is made from solid materials. Hole making tools are normally only used in the internal cutting mode.

The second shape is an end mill which is essentially a short stout drill that cuts with its sides. End mill tools are used in mills or machining centers and can cut in either the internal cutting or external cutting modes. Larger diameter end mills may use inserts as described below.

The last and most common shape is the insert tool. Inserts are commonly made from, or coated with, very hard materials such as silicon carbide, ceramic or even diamond. Inserts are made in small flat pieces in the shape of rhomboids, circles, triangles or other polygons. Inserts are often provided with a hole in the center thereof that allows them to be fitting into holders and secured therein with clamps and screws.

One shape variation of the insert tool is a so-called trigon insert. The trigon insert tool is held by a special tool holder. The system is not widely used as the combination of tool holder and trigon insert tool is not as rigid as some of the other variations. Another shape variation is the cylindrical insert which is cylindrical in shape with the round side wall being the cutting surface.

As metal cutting proceeds, the insert will wear down and must be periodically replaced with another identical insert. Often times, inserts will have more than one cutting edge or tip that can be used. Thus, the insert can be flipped over, or rotated, or both to bring another tip into use. A square or rhomboid insert can have up to eight tips that can be used until the insert is discarded. While inserts are almost never sharpened for reuse, the inserts are recycled for their cobalt content. In contrast, the insert holder is generally reusable forever.

At present, all insert changes must be performed manually using tools. Since most inserts are held in place with two different sized allen screws, it takes a relatively long time to change an insert. There is no automated technique for replacing or realigning such inserts. The operator must be highly skilled to properly change or realign said insert and, conversely, this skill level leads to frequent incorrect installations. Such incorrect installations can lead to significant scrap losses. In addition, both the screws holding said inserts and the threaded holes receiving said screws wear or strip out. As a consequence, operators of insert equipped machinery simply do not like to change inserts.

There have been some attempts to address these issues. U.S. Pat. No. 5,683,212 entitled "Clamping Assembly for Tapered Hollow Shank of Tooling System" which issued on Nov. 4, 1997 to Cirino et al. discloses a clamping assembly for a cutter holder tool which includes a button 40 which clamps against a tapered shank so that said tool is urged inwardly by a spring (not shown) seated on the reduced diameter land 60.

U.S. Pat. No. 4,420,280 entitled "Tool Block" which issued on Dec. 13, 1983 to Gustafson shows a tool block for a lever actuated quick release mechanism which is provided with a cutting insert holder 12 and a clamping device comprised of a pivotally arranged lever 20, one end of which acts on the cutting insert holder 12 while the other end of which cooperates with a spring loaded device 21.

U.S. Pat. No. 3,981,607 entitled "Boring Bar with Removable and Indexable Cutting Insert" which issued on Sep. 21, 1976 to Jorgensen has a manual button 100 release mechanism for a cutting insert 12 which may be removed by releasing the pressure applied to the finger 28 through the clamp insert 14 by means of a manual button 100 which, when depressed, will contact the forward end 83 of the wedge shaft 74 thereby forcing the wedge shaft 74 to the right causing the ball 84 and the clamp release pin 60 to drop down.

U.S. Pat. No. 4,210,038 entitled "Lathe Having a Guided Movable Cutter" which issued on Jul. 1, 1980 to Hill provides a cutting tool holder which includes vertical positioning knob 17 and a coarseness selector handle 17 for adjusting the positioning of the cutter holder.

None of the known prior art disclose the combination set forth herein.

SUMMARY OF THE INVENTION

It is an object of this invention to provide an improved holder for quick changes of variant shaped cutter inserts.

It is a further object of this invention to provide an improved holder which requires no tools or screws for securing or removing a trigon cutter insert.

It is a further object of this invention to provide an improved holder which requires no tools or screws for securing or removing a cylindrical cutter insert It is still another object of this invention to provide an improved holder which is designed for manual operation but is capable of being automated.

It is an object of this invention to provide an improved holder for variant shaped cutting inserts which reduces scrap by not closing if incorrect installation.

It is still another object to provide an improved holder for variant shaped cutting inserts which can be changed in seconds.

It is a further object to provide an improved holder for variant shaped cutting inserts which provides a rigid combination for cutting metal.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
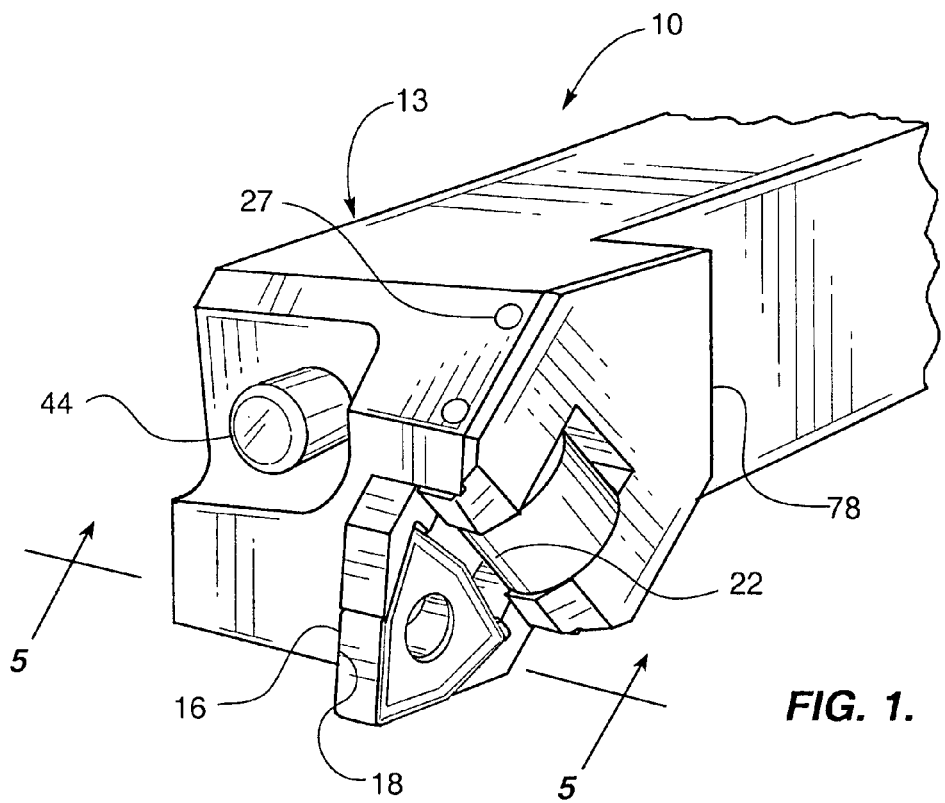
FIG. 1 is a perspective view of the present invention with a trigon cutter insert in a release position.

Referring more particularly to the drawings by characters of reference, FIGS. 1-5 disclose combinations of features which constitute the components of a self contained, toolless quick change tool holder 10 for holding variant shaped cutter inserts on machine tools. In the embodiment of FIGS. 1-5, variant shaped cutter inserts are six sided trigon shaped cutter inserts 16. Self contained, toolless quick change tool holder 10 comprises a housing 13 having at least one seat portion 18 which is adapted to receive and conform to the shape of cutter insert 16.

A clamping arm 12 is movably mounted to a cap 78 which, in turn, is mounted to housing 13. Clamping arm 12 has a clamp portion 22 extending over seat portion 18, clamp portion 22 adapted to engage trigon trigon cutter insert 16.

Figure 3:
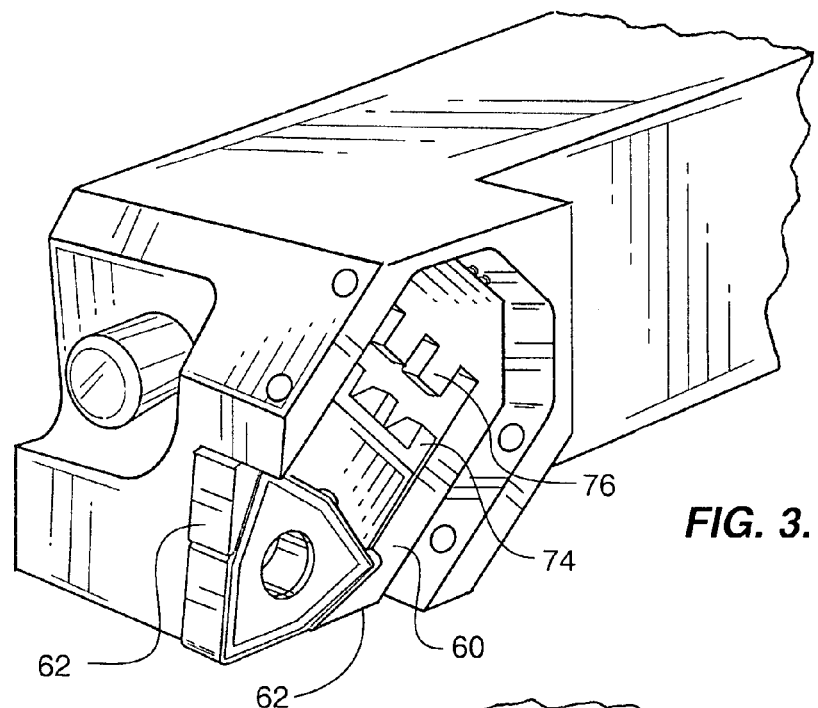
FIG. 3 is a perspective partial cut away view of the present invention with a trigon cutter insert in a clamp position.
Figure 4:
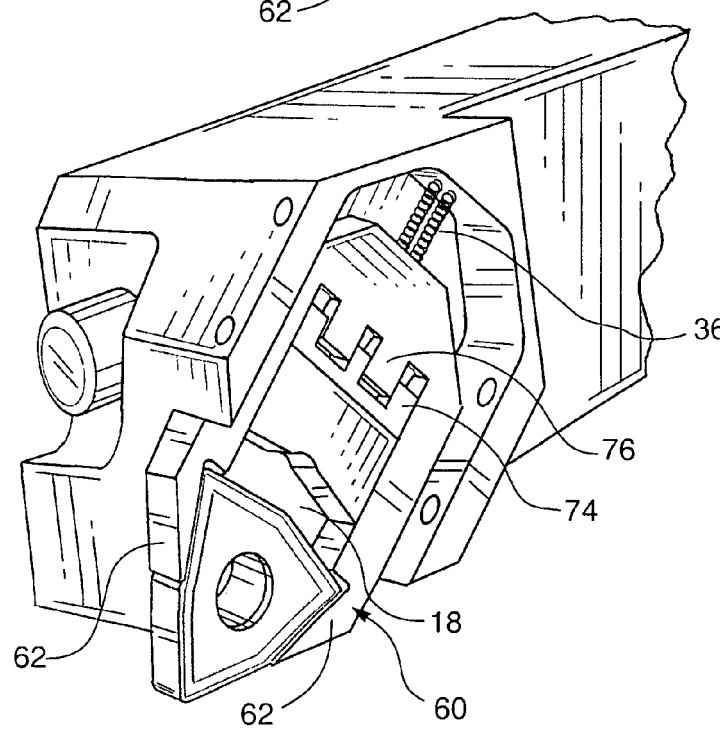
FIG. 4 is a perspective view of FIG. 3 in a release position.

A fork 60, best seen in FIGS. 3 and 4, includes two tines 62 which are adapted to engage opposing sides of trigon cutting insert 16. Tines 62 are inwardly sloping to prevent trigon cutting insert 16 from moving when in a cutting position as described in more detail below.

A locking mechanism 15 is completely contained within housing 13 whereby no external tools are needed to actuate said locking mechanism. Locking mechanism 15 has a clamp position which forces clamp portion 22 of clamping arm 12 and tines 62 of fork 60 to engage trigon cutter insert 16 and a release position which forces clamp portion 22 and tines 62 to disengage from trigon cutter insert 16 to allow removal and replacement of said trigon cutter insert, locking mechanism 15 being movable between the release position and the clamp position without the use of external tools such as alien wrenches and the like.

Figure 5:
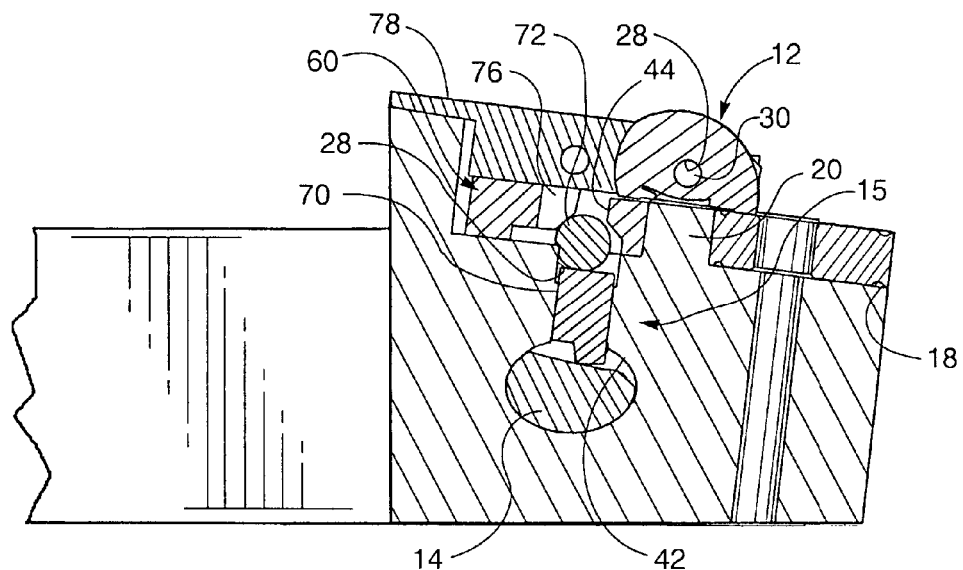
FIG. 5 is a cross sectional side view of the present invention showing a cam in a clamp position.

As best seen in FIG. 5, the presently preferred embodiment, locking mechanism 15 comprises clamping arm 12, piston 70, roller 72, cam 14, clamp drive 74 and fork drive 76 to speed the process of changing trigon cutter insert 16.

As is well known in the art, trigon cutter insert 16 has a six sided shape. To accommodate trigon cutter insert 16, cutter insert housing 13 includes seat portion 18 and a cutout bench 20 which receives and conforms to the shape of the rear of trigon cutter insert 16. Seat portion 18 is shown in as a integral piece but may, in fact, be separately connected to insert housing 13 as a replaceable part.

Figure 2:
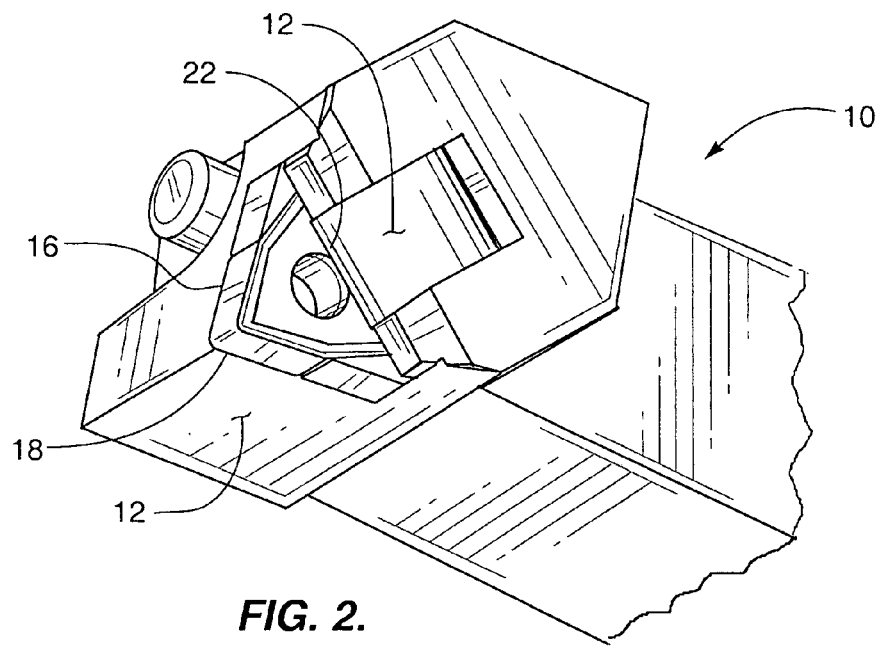
FIG. 2 is a perspective view of FIG. 1 in a clamp position.

Clamping arm 12 is mounted to an clamping arm axle 30 extending through elongated holes 27 in insert housing 13 and cap 78 to allow rotation of clamping arm 12 thereabout between a clamping position shown in FIGS. 2 and 3 to a release positions shown in FIGS. 1 and 4. Clamping arm 12 has clamp portion 22 extending from said elongated hole out of clamping arm slot 27 to a position over seat portion 18 and trigon cutter insert 16. Using the present invention, trigon cutter inserts 16 are held down in place by clamp portion 22.

When fork 60 is moved inward towards housing 13, tines 62 are engaged with trigon cutter insert 16 thereby pulling and holding the insert inwardly to firmly engage cutout bench 20. Cap 78 is positioned above fork 60 thereby holding the fork in the desired vertical position. At the same time, clamping arm 12 rotates whereby clamp portion 22 is pushed firmly downwardly onto the top of trigon 16. The combination of clamping arm 12 and fork 60 holds trigon cutter insert 16 in place.

Figure 6:
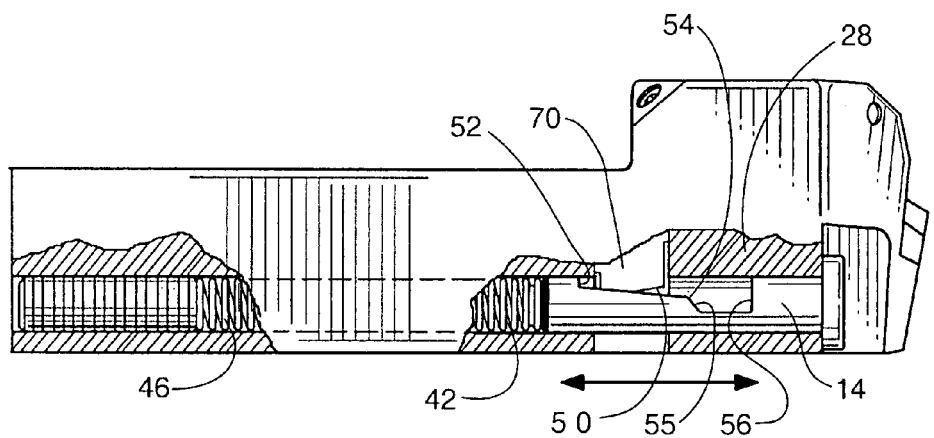
FIG. 6 is a partial cross sectional side view of the present invention showing a cam.

In the presently preferred embodiment best seen in FIG. 6, cam 14 is generally a linear cylindrical profile which is mounted into insert housing 13 in a cam cavity 42. A button 44 is positioned outside cam cavity 42 at one end of cam 14. The other end of cam 14 engages a cam spring 46 which is a compression spring positioned in cam cavity 42 opposite button 44. Cam cavity 42 connects to a piston cylinder 28 within insert housing 13 whereby one end of piston 70 rests upon cam 14.

As best seen in FIG. 6, intermediate between button 44 and cam spring 46, cam 14 includes a sloped portion 50 which slopes inwardly from a shallow cut 52 proximate to cam spring 46 to a deeper cut 54 in the direction of button 44. A trough 56 extends further into cam 14 from deeper cut 54 proximate to and towards button 44.

Cam spring 46 biases cam 14 towards button 44 whereby one end of piston 70 rests upon sloped portion 50. Sloped portion 50 rotates clamping arm 12 to the clamp position and holds at that position. This metal to metal push results in a firm clamp position by elimination of any give or spring in the design thereof.

As best seen in FIG. 5, in this clamp position, piston 70 pushes roller 72 upwardly into clamp drive 74 and fork drive 76. With regard to clamp drive 74, that element, in turn, pushes upwardly on the end of clamp 12 opposing clamp portion 22. The movement of clamp drive 74 rotates clamp 12 clockwise about axle 30 whereby clamp portion 22 is pressed firmly onto trigon cutter insert 16.

With regard to fork drive 76, the upward movement of roller 72 is translated into inward movement of fork 60 as the fork cannot move upwardly due to cap 78. The movement pulls fork 60 and trigon insert 16 captured between tines 62, inwardly to the clamp position. As shown, a pair of clamp arm compression springs 36 bias fork 60 to the clamping position.

To change from the clamp position to the release position, button 44 is pushed firmly toward insert housing 13 which pushes cam 14 inwards against a cam spring 46. End of piston 70 moves from sloped portion 50 to drop into trough 56 via a sharp drop off 55. When piston 70 reaches trough 56, cam 14 is in a fully disengaged position.

In this position, roller 72 drops downwardly thereby releasing clamp drive 74 and fork drive 76. Clamp 12 rotates counterclockwise (as illustrated) to release trigon cutter insert 16 and fork 60 moves outwardly from housing 13, such movement releasing trigon cutter insert 16 for replacement.

To return to the clamp position, the user simply presses downwardly on clamp portion 22. The resistance of clamping arm compression spring 36 is overcome and piston 70 re-engages the sloped portion 50 of cam 14 to push, with assistance from cam spring 46. Cam 14 is then back to a fully clamped position for trigon cutter insert 16 use. The force needed to return to the clamp position is controlled by the angle of drop off 55.

Figure 7:
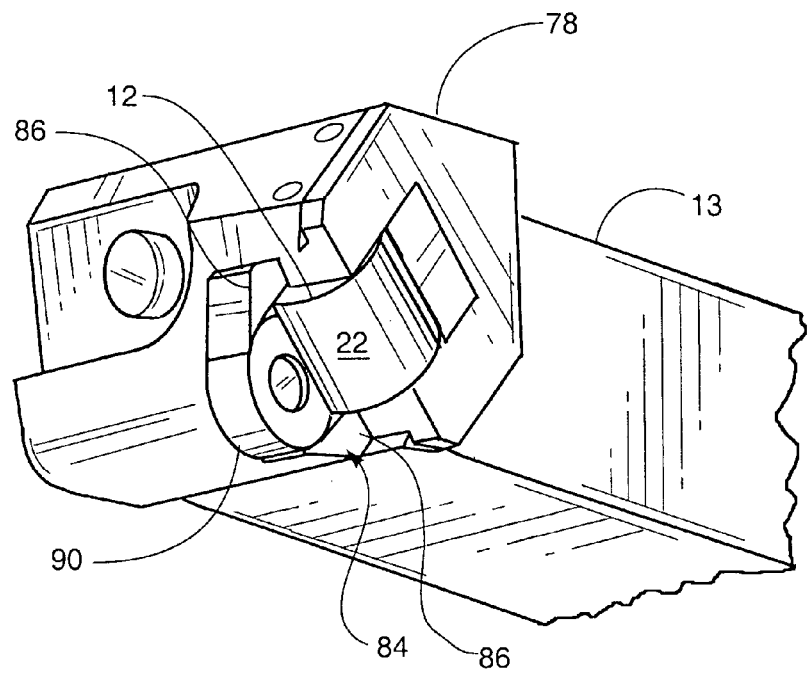
FIG. 7 is a perspective view of the present invention with a cylindrical cutter insert in a clamp position.
Figure 8:
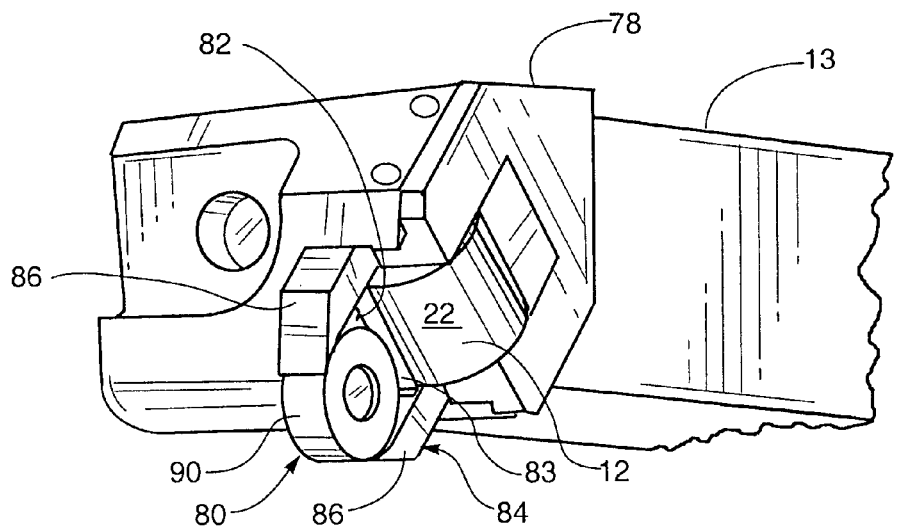
FIG. 8 is a perspective view of the present invention with a cylindrical cutter insert in a release position.

Another variant shaped cutter insert, namely, a cylindrical cutter insert 80, is shown in FIGS. 7 and 8 in a clamp position and a release position, respectively. As is well known in the art, cylindrical cutter insert 80 has a circular profile. To accommodate cylindrical cutter insert 80, cutter insert housing 13 includes seat portion 82 and a cutout bench 83 which receives and conforms to the shape of the rear of cylindrical cutter insert 80. Seat portion 82 is shown in as a integral piece but may, in fact, be separately connected to insert housing 13 as a replaceable part.

Clamping arm 12 functions identically as previously described. A circular fork 84 is moved inward towards housing 13, circular fork tines 86 are engaged with circular cutter insert 80 thereby pulling and holding the insert inwardly to firmly engage cutout bench 83. As shown, circular fork tines 86 curve inwardly and engage a sidewall 90 of said circular cutter insert 80 whereby the larger portion of its said sidewall's circumference is positioned between the ends of said tines 86 and bench cutout 83. Cap 78 is positioned above circular fork 84 thereby holding the circular fork in the desired vertical position. At the same time, clamping arm 12 rotates whereby clamp portion 22 is pushed firmly downwardly onto the top of circular cutter insert 80. The combination of clamping arm 12 and circular fork 84 holds circular cutter insert 80 firmly in place.

Although only certain embodiments have been illustrated and described, it will be apparent to those skilled in the art that various changes and modifications may be made therein without departing from the spirit of the invention or from the scope of the appended claims.

What is claimed is:

1. A self contained, toolless quick change tool holder for cylindrical cutter inserts on machine tools, the self contained quick change tool holder comprising:

a housing having at least one seat portion which is adapted to receive and conform to the shape of a cylindrical cutter insert, two tines which are adapted to engage only opposing sides of the cylindrical cutting insert, the two tines preventing the cylindrical cutting insert from moving;

a locking mechanism, the locking mechanism having a clamp position which forces the two tines to engage a cylindrical cutter insert, the locking mechanism having a release position which forces the two tines to disengage from the cylindrical cutter insert to allow removal and replacement of said cylindrical cutter insert, the locking mechanism manually movable between the release position and the clamp position without the use of tools, and a clamping arm mounted in the housing, the clamping arm movable in the housing, the clamping arm having a clamp portion extending over the seat portion, the clamp portion adapted to engage a top surface of the cylindrical cutter insert.

2. The self contained, toolless quick change tool holder of claim 1 wherein the locking mechanism comprises a cam having a generally linear cylindrical profile which is mounted into the housing in a cam cavity, a manually operable button is positioned outside the cam cavity at one end of the cam and the other end of the cam engages a cam spring which is a compression spring positioned in the cam cavity opposite the button, the cam cavity connecting to a piston cylinder contained within the housing whereby one end of the piston rests upon the cam, the cam having a sloped portion intermediate between the button and the cam spring, the cam spring biasing the cam towards the button and one end of the piston rests upon the sloped portion, when the piston is lifted upwardly, the piston pushes a roller upwardly into a clamp drive and a fork drive, the clamp drive pushing upwardly on the end of the clamp opposing the clamp portion thereby rotating the clamp about the axle the clamp portion is pressed firmly onto the cylindrical cutter insert, the fork drive being pushed laterally to engage the fork into the clamping position.

3. The self contained, toolless quick change tool holder of claim 2 wherein the sloped portion slopes inwardly from a shallow cut proximate to the cam spring to a deeper cut in the direction of the button, the cam further including a trough which extends further into said cam.

4. The self contained, toolless quick change tool holder of claim 1 wherein the two tines are curved inwardly to hold the cylindrical cutting insert firmly in the clamping position.

5. A self contained, toolless quick change tool holder for trigon cutter inserts on machine tools, the self contained quick change tool holder comprising:

a housing having at least one seat portion which is adapted to receive and conform to the shape of a trigon cutter insert, two tines which are adapted to engage opposing sides of the trigon cutting insert, the two tines preventing the trigon cutting insert from moving;

a locking mechanism, the locking mechanism having a clamp position which forces the two tines to engage a trigon cutter insert, the locking mechanism having a release position which forces the two tines to disengage from a trigon cutter insert to allow removal and replacement of said trigon cutter insert, the locking mechanism manually movable between the release position and the clamp position without the use of tools, and a clamping arm mounted in the housing, the clamping arm movable in the housing, the clamping arm having a clamp portion extending over the seat portion, the clamp portion adapted to engage a top surface of the cylindrical cutter insert.

6. The self contained, toolless quick change tool holder of claim 5 wherein the seat portion includes a cutout bench which receives and conforms to the shape of the rear of the trigon cutting insert.

7. The self contained, toolless quick change tool holder of claim 5 wherein the two tines are curved inwardly to hold the trigon cutting insert firmly in the clamping position.

8. The self contained, toolless quick change tool holder of claim 5 wherein the locking mechanism comprises a cam having a generally linear cylindrical profile which is mounted into the housing in a cam cavity, a button is positioned outside the cam cavity at one end of the cam and the other end of the cam engages a cam spring which is a compression spring positioned in the cam cavity opposite the button, the cam cavity connecting to a piston cylinder contained within the housing whereby one end of the piston rests upon the cam, the cam having a sloped portion intermediate between the button and the cam spring, the cam spring biasing the cam towards the button and one end of the piston rests upon the sloped portion, when the piston is lifted upwardly, the piston pushes a roller upwardly into a clamp drive and a fork drive, the clamp drive pushing upwardly on the end of the clamp opposing the clamp portion thereby rotating the clamp about the axle the clamp portion is pressed firmly onto the trigon cutter insert, the fork drive being pushed laterally to engage the fork into the clamping position.

9. The self contained, toolless quick change tool holder of claim 8 wherein the sloped portion slopes inwardly from a shallow cut proximate to the cam spring to a deeper cut in the direction of the button, the cam further including a trough which extends further into said cam.

10. A self contained, toolless quick change tool holder for cutter inserts on machine tools, the self contained quick change tool holder comprising:
   a housing having at least one seat portion which is adapted to receive and conform to the shape of a cutter insert,
   a clamping arm mounted in the insert housing, the clamping arm movable in the insert housing, the clamping arm having a clamp portion extending over the seat portion, the clamp portion adapted to engage a top surface of a cutter insert, and
   a locking mechanism, the locking mechanism having a clamp position which forces the clamp portion of the clamping arm to engage a cutter insert, the locking mechanism having a release position which forces the clamp portion to disengage from a cutter insert to allow removal and replacement of said cutter insert, the locking mechanism being manually movable between the release position and the clamp position without the use of tools.

* * * * *